United States Patent [19]
Tzeng et al.

[11] Patent Number: 5,448,407
[45] Date of Patent: Sep. 5, 1995

[54] EQUIVALENT WOLLASTON PRISM FOR AN OPTICAL PICK-UP HEAD AND AN OPTICAL PICK-UP HEAD USING OF THE SAME

[75] Inventors: Jiin-Shyan Tzeng; Chien-Chung Pien, both of Taipei; Tsung-Ming Yang, Kee-Lung; Pei-Yuh Liu, Chang-Hwa, all of Taiwan

[73] Assignee: Industrial Technology Research Institute, Taiwan, Taiwan

[21] Appl. No.: 115,701

[22] Filed: Sep. 3, 1993

[51] Int. Cl.$^6$ .................. G02B 27/10; G02B 27/12
[52] U.S. Cl. .................................................. 359/638
[58] Field of Search ............... 359/633, 637, 638, 639, 359/640, 641, 618; 356/356, 366, 369; 369/110

[56] References Cited

U.S. PATENT DOCUMENTS

| | | | |
|---|---|---|---|
| 4,367,009 | 1/1983 | Suzki | 350/6.5 |
| 4,963,003 | 10/1990 | Hiiro | 350/403 |
| 4,969,730 | 11/1990 | van den Brandt | 353/31 |
| 5,056,887 | 10/1991 | Ohshima | 385/36 |
| 5,084,783 | 1/1992 | Dewey et al. | 359/640 |

*Primary Examiner*—Akm E. Ullah
*Attorney, Agent, or Firm*—Michael D. Bednarek; Marks & Murase

[57] ABSTRACT

An equivalent Wollaston prism is disclosed for splitting an incident light beam into two adjacent beams which are S-polarized and P-polarized respectively. The polarized light beams are at approximately a right angle with the incident light beam, therefore the structure of optical pick-up head will not be limited to a straight line configuration. The entire structure is compact, easy to align, and economical.

9 Claims, 4 Drawing Sheets

EQUIVALENT WOLLASTON PRISM FOR AN OPTICAL PICK-UP HEAD AND AN OPTICAL PICK-UP HEAD USING OF THE SAME

BACKGROUND OF THE INVENTION

1. Field of the Invention

The present invention relates to an equivalent Wollaston prism for an optical pick-up head and an optical pick-up head using the same, and more particularly to a Wollaston prism for an optical pick-up head that is compact in size and cheap, and an optical pick-up head using the equivalent Wollaston prism which is easy to align.

2. Description of Prior Art

Ordinarily, an optical pick-up head for a magneto-optical disk system essentially consists of a collimating lens, several beam splitters, and other lenses, so as to detect a RF signal, focusing signal, and tracking signal. These signals are then conducted onward for further processing whereby data can be extracted from an optical disk. Usually the pick-up head is constructed of more than ten components which are difficult to assemble and align. Consequently, Wollaston prisms, as disclosed in U.S. Pat. Nos. 4,771,414 and 4,951,274, are used to solve the problem of complexity. Taking U.S. Pat. No. 4,771,414 414 as an example, the structure of a pick-up head using the Wollaston prism is shown in FIG. 1. Pick-up head 10 essentially consists of a semiconductor laser 11, a collimating lens 12, a first polarizing beam splitter 13, an objective lens 14, a second polarizing beam splitter 15, a first light receiving lens 16, a first photodetector 17, a phase compensator 18, a half-wave plate 19, a Wollaston prism 20, a second light receiving lens 2, and a second photodetector 22. A laser light beam L is emitted from the semiconductor laser 11, then collimated by the collimating lens 12. The first polarizing beam splitter 13 deflects the laser light beam L toward the objective lens 14, then the laser light beam L is focused on an optical disk 30. The reflected laser beam L is focused by the objective lens 14 and then deflected by the first polarizing beam splitter 13 toward the second splitter 15. Laser beam L is split into a first laser beam L1 and a second laser beam L2. The first laser beam L1 is directed to the photodetector 17 through the first light-receiving lens 16. The photodetector 17 receives the laser beam L1 and generates a detection output signal. An error signal generating section 31 receives the detection output signal of the photodetector 17 and produces a focusing error signal Sf and a tracking error signal St for the focusing servo-control and the tracking servo-control respectively. The second laser beam L2 passes through the half-wave plate 19 straight to the Wollaston prism 20 through a phase compensator 18. The second laser beam L2 is further divided into a P-polarized component LP and a S-polarized component LS, then focused on the second photodetector 22 through the second light receiving lens 22. An information signal generating section 32 receives both the P-polarized component LP and the S-polarized component LS, then generates a reproduced information signal Si.

However, in the conventional optical pick-up apparatus above discussed, the information signal Si, the focusing error signal Sf, and the tracking error signal St are detected separately, therefore creating a bulky complicated, and expensive structure for this apparatus. Furthermore, the Wollaston prism in this apparatus, which is composed of two dual refractive prisms, requires a great deal of space, is very expensive, and is difficult to align. Most of all, this kind of Wollaston prism guides the laser beam directly, so the entire system must be arranged in a straight line, therefore limiting how much the structure can be minimized.

SUMMARY OF THE INVENTION

The primary object of the present invention is to provide an equivalent Wollaston prism for splitting an incident light beam into two adjacent beams which are S-polarized and P-polarized respectively, and both rotated about 90 degrees.

The secondary object of the present invention is to provide an optical pick-.up head with optimized design comprising very few parts that can be easily manufactured at low cost.

According to the present invention, an equivalent Wollaston prism for polarizing and splitting an incident light beam, comprises a first prism, having an incident plane for receiving the incident light beam, a polarizing splitting plate at a first predetermined angle with said incident plane, and an emerging plane as a second predetermined angle with said polarizing splitting plate, wherein said polarizing splitting plate splits said incident light beam into a reflected beam and a remaining component; and a second prism, having a boundary plane which is attached to the polarizing splitting plane of said first prism, and a reflecting plane at a third predetermined angle for reflecting the remaining component of the incident light beam toward said emerging plate.

According to the present invention, an optical pick-up head for picking up information on an optical disk comprises a laser beam generating device for emitting a light beam; a light beam guiding device to guide said light beam onto the disk and split the reflected light beam of said light beam; an equivalent Wollaston prism, including a first prism, having an incident plane for receiving said light beam, a polarizing splitting plate at a first predetermined angle with said incident plane, and an emerging plane as a second predetermined angle with said polarizing splitting plate, wherein said polarizing splitting plate splits the light beam into a reflected first polarized beam and a second polarized beam, a second prism, having a boundary plane which is attached to the polarizing splitting plane of said first prism, and a reflecting plane at a third predetermined angle for reflecting the second polarized beam toward said emerging plate; and a photodetecting unit, for receiving the first and second polarized beams and generating detecting signals according to the first and second polarized beams.

BRIEF DESCRIPTION OF THE DRAWINGS

The present invention can be more fully understood by referring to the following detailed description and accompanying drawings, which form an integral part of this application.

DETAILED DESCRIPTION OF THE PREFERRED EMBODIMENT

Figure 1:
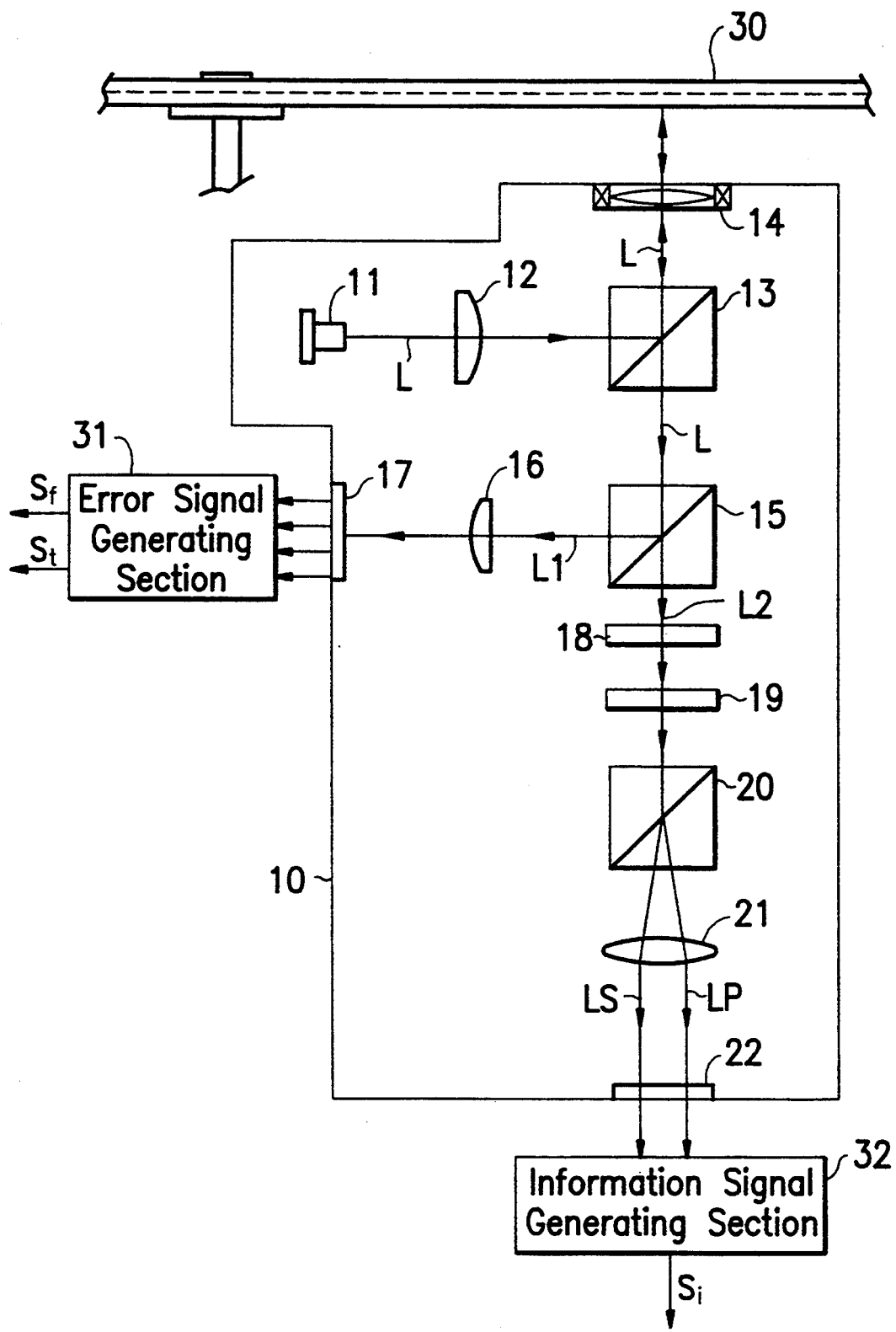
FIG. 1 is a diagram showing the structure of a conventional optical pick-up head using a conventional Wollaston prism.
Figure 2A:
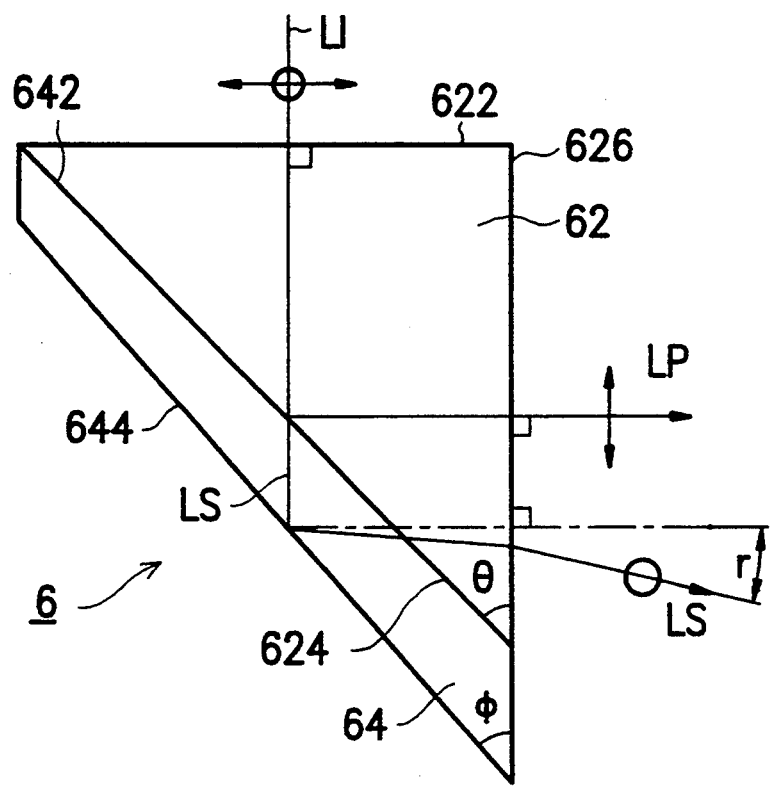
FIG. 2a is a diagram showing a preferred embodiment of an equivalent Wollaston prism according to the present invention.
Figure 2B:
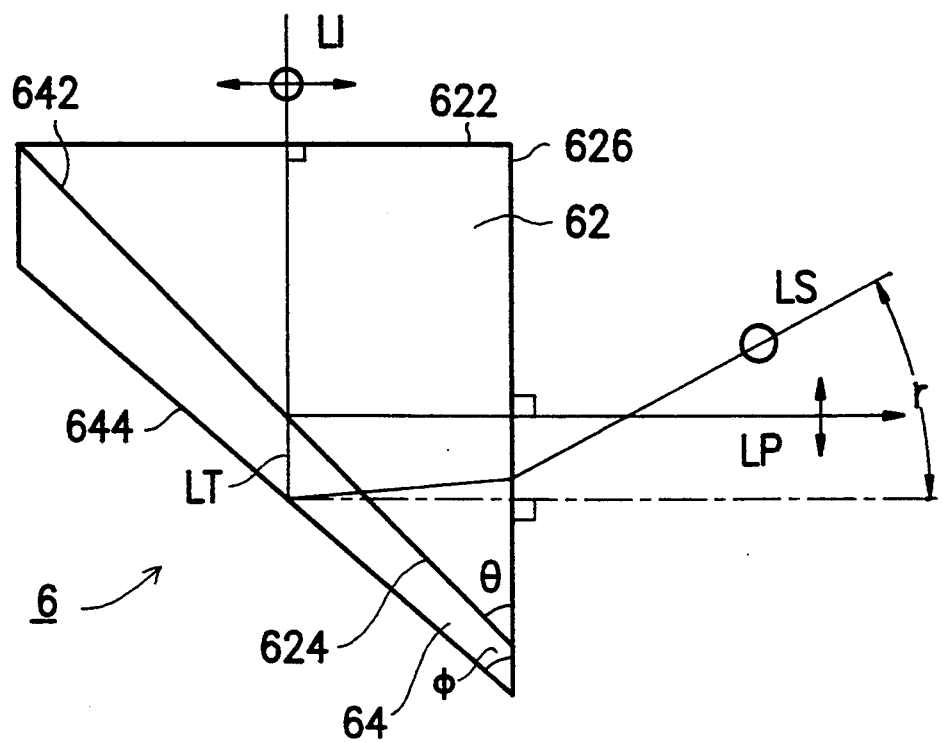
FIG. 2b is a diagram showing another preferred embodiment of the equivalent Wollaston prism according to the present invention.

Please refer to FIG. 2, which shows the schematic diagrams of two preferred embodiments according to the equivalent Wollaston prism of the present invention. The equivalent Wollaston prism 6 is composed of a first prism 62 and a second prism 64. The first prism 62 has an incident plane 622, a polarizing splitting plate 624, and an emerging plane 626. A beam of incident light LI enters the equivalent Wollaston prism 6 through the incident plane 622, having its optical axis directed toward the polarizing splitting plate 624. The polarizing splitting plate 624 is set at a first predetermined angle with the incident plane 622, and coated with a film to split the light beam LI into a first reflected beam LP (having the P-polarized component of the beam LI) and a remaining component LS (having the S-polarized component of the beam LI). The emerging plane is set at a second predetermined angle $\theta$ with the polarizing splitting plane 624, where the first reflected beam LP emerges. The second prism 64 has a boundary plane 642 and a reflecting plane 644. Boundary plane 642 is the boundary between the first prism 62 and the second prism 64, where the second prism 64 is attached to the polarizing splitting plane 624. The reflecting plane 644 is set at a third predetermined angle $\phi$ with the emerging plane 626 of the first prism 62, to reflect the remaining part of light beam LI named the second reflected beam LS, which contains the S-polarized component of the light beam LI. The second reflected beam LS emerges from the equivalent Wollaston prism 6 through the emerging plane 626 of the first prism 62. In the present invention, the preferred value of the first predetermined angle and the second predetermined angle $\theta$ is 45 degrees, therefore the incident light beam LI is at a right angle with the first reflected beam LP, making the entire system easy to design and assemble. In order to achieve full reflection,, the value of the angle $\phi$ is determined by the equation:

$$\phi < 900° - \sin^{-1}(1/n),$$

wherein n is the refractive index of the material of the first and second prisms 62 and 64. When $\phi$ is less than 45 degrees, the path of the second reflected beam LS is shown in the FIG. 2a. When $\phi$ is greater than 45 degrees, the path of the second reflected beam LS is shown in the FIG. 2b. The refraction angle r of the second beam LS is determined by the equation:

$$r = \sin^{-1}[n*\sin(90° - 2\phi)].$$

From the equation shown above we can see that the value of $\phi$ should be carefully designed so that the first and second reflected beams LP and LS will be projected to appropriate positions for further processing.

Figure 3:
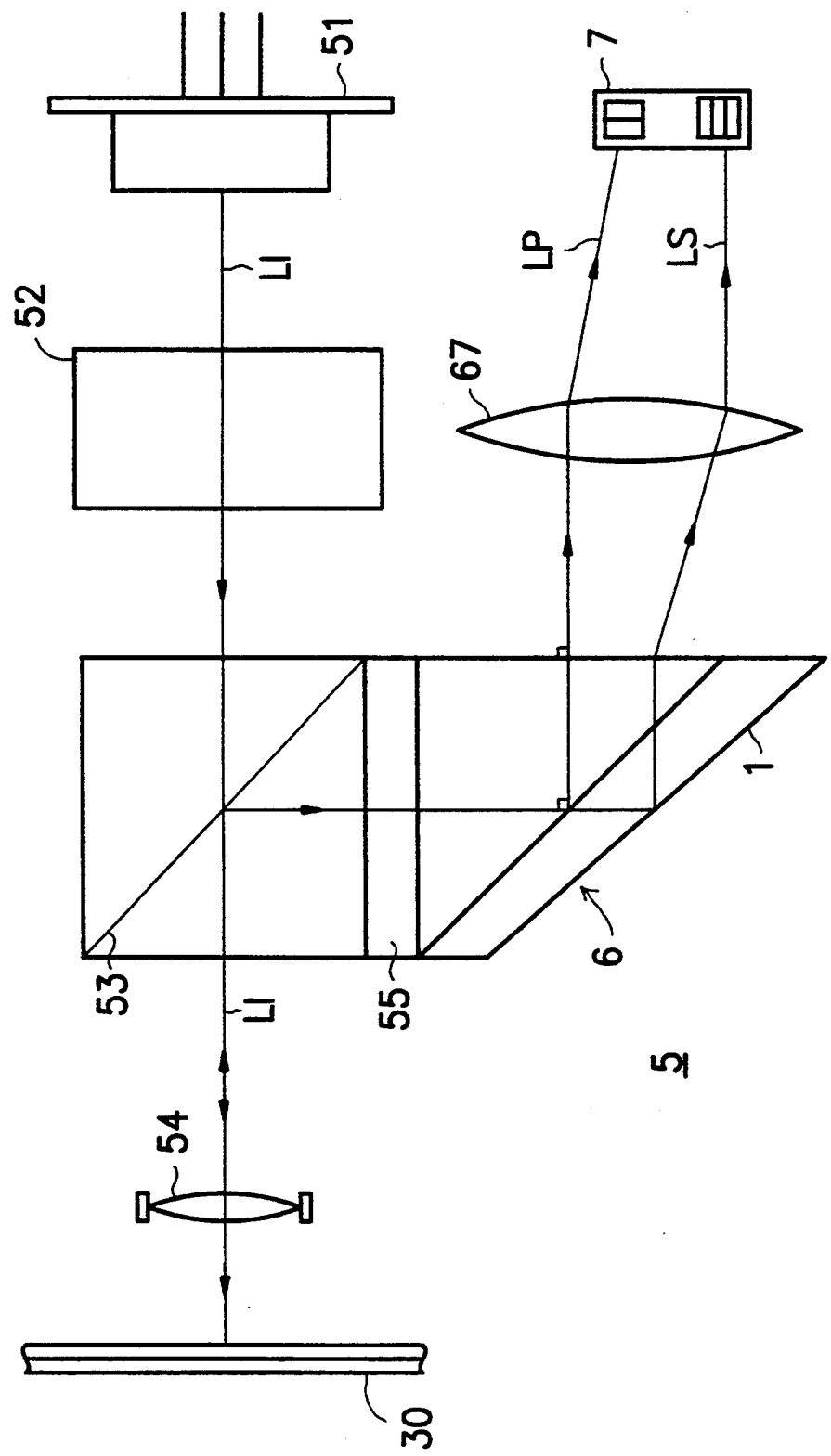
FIG. 3 is a diagram showing an optical pick-up head using the equivalent Wollaston prism according to the present invention.

Please refer to FIG. 3 which shows the schematic view of an optical pick-up head system using the equivalent Wollaston prism shown in FIG. 2. The optical pick-up head 5 according to the present invention comprises a laser beam generating device 51 (e. g. a semiconductor laser), a collimating lens 52, a beam splitter 53, an objective lens 54, a half-wave plate 55, an equivalent Wollaston prism 6 (as shown in FIG. 2), a light receiving lens 67, a photodetecting unit 7, and a signal generating device 8. The laser light beam LI emitted from the laser beam generating device 51 is collimated by the collimating lens 52 and projected through the splitter 53, then focused on the optical disk 30 by the objective lens 54. The reflected laser beam LI is focused by the objective lens 54 and then deflected by the splitter 53 toward the equivalent Wollaston prism 6 through the half-wave plate 55. By the equivalent Wollaston prism 6, the reflected laser beam LI is split into a P-polarized component LP and a S-polarized component LS. After passing through the light receiving lens 67, the P-polarized component LP and the S-polarized component LS are projected onto the photodetecting unit 7.

Figure 4:
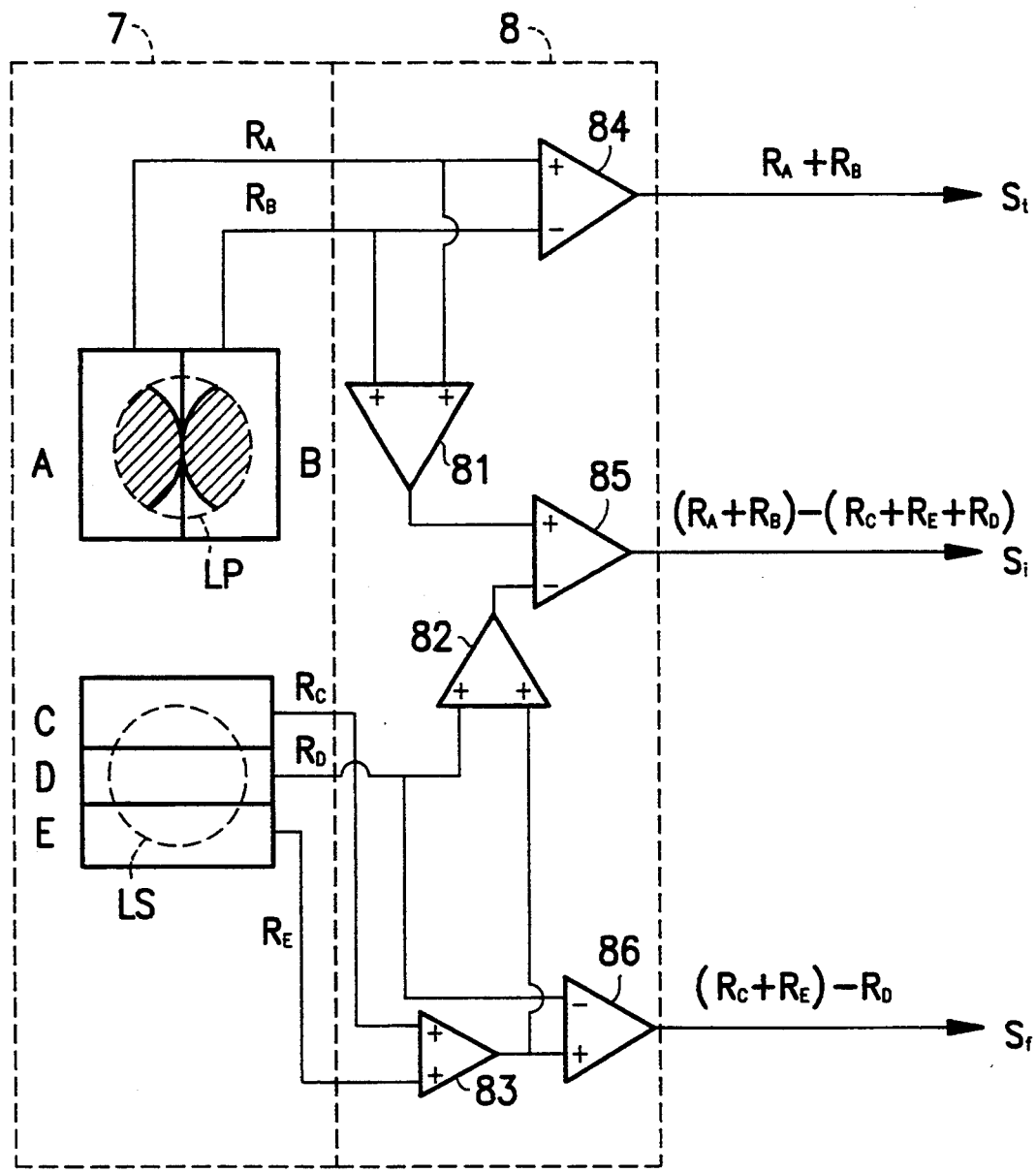
FIG. 4 is a diagram showing the circuits of a photodetecting unit and a signal generating device of the preferred embodiment.

Please further refer to FIG. 4 which shows the schematic diagram of the circuit of the photodetecting unit 7 and the signal generating device 8 according to the present invention. The photodetecting unit 7 has five light detecting elements A, B, C, D, and E for detecting the P-polarized component LP and the S-polarized component LS of the reflected laser beam LI. Detecting signals $R_A$, $R_B$, $R_C$, $R_D$, and $R_E$, generated by the light detecting elements are sent to the signal generating device 8. Signal generating device 8 is constructed by adders 81, 82, 83, and subtracters 84, 85, 86. The signal generating device 8 receives the detecting signals $R_A$, $R_B$, $R_C$, $R_D$, and $R_E$, and produces a tracking error signal $S_t$ (equals $R_A - R_B$), information signal $S_i$ (equals $(R_A + R_B) - (R_C + R_D + R_E)$), and focusing error signal $S_f$ (equals $(R_C + R_E) - R_D$).

Due to the structures of the rectangular-like first prism 62 and the thin second prism 64, the equivalent Wollaston prism 6 according to the present invention is compact in its size. Under such a structure, the reflected laser beam LI is turned about 90 degrees when it is split into a S-polarized component and P-polarized component. Therefore, the structure of the entire pick-up head no longer has to be in line, thus reducing the volume of entire system and the complexity of assembly, and further releasing more room for the design of the pick-up head. The total number of elements and the cost is reduced because the structure according to the present invention detects the information signal and the focusing error signal and the tracking error signal by only one signal generating device, a photodetector having five light detecting elements. Therefore the entire structure is simple, minimal, and cost efficient in comparison to pick-up heads produced with prior arts.

While the invention has been described in terms of what is considered to be the most practical and preferred embodiment, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. An equivalent Wollaston prism, for polarizing and splitting an incident light beam, comprising:

a first prism, having an incident plane for receiving the incident light beam, a polarizing splitting plate at a first predetermined angle with said incident plane, and an emerging plane at a second predetermined angle with said polarizing splitting plate, wherein said polarizing splitting plate coated with a film splits said incident light beam into a first reflected beam and a remaining component; and a second prism, having a boundary plane which is attached to the polarizing splitting plane of said first prism, and a reflecting plane at a third predetermined angle for reflecting said remaining component from said first prism toward said emerging plane to form a second reflected beam;

whereby said first and second reflected beams are two adjacent beams which are P-polarized and S-polarized respectively, and both rotated some degrees according to said second and third predetermined angles.

2. An equivalent Wollaston prism, for polarizing and splitting an incident light beam, as claimed in claim 1, wherein said first and second predetermined angles are 45 degrees.

3. An equivalent Wollaston prism, for polarizing and splitting an incident light beam, as claimed in claim 1, wherein said third predetermined angle $\phi$ is determined as $$\phi < 90° - \sin^{-1}(1/n),$$

wherein n is the refractive index of the material of said first and second prisms.

4. An equivalent Wollaston prism, for polarizing and splitting an incident light beam, as claimed in claim 3, wherein said first and second predetermined angles are 45 degrees.

5. An optical pick-up head, for picking up information on an optical disk, comprising:
a laser beam generating device for emitting a light beam;
a light beam guiding device for guiding said light beam onto the disk and splitting a reflected light beam of said light beam;
an equivalent Wollaston prism, including a first prism having an incident plane for receiving said light beam, a polarizing splitting plate at a first predetermined angle with said incident plane, and an emerging plane at a second predetermined angle with said polarizing splitting plate, wherein said polarizing splitting plate coated with a film splits the light beam into a first reflected polarized beam and a remaining component, a second prism, having a boundary plane which is attached to the polarizing splitting plane of said first prism, and a reflecting plane at a third predetermined angle for reflecting said remaining component from said first prism toward said emerging plane to form a second reflected beam; and a photodetecting unit, for receiving the first and second polarized beams and generating detecting signals according to the first and second polarized beams;

whereby said first and second reflected beams are two adjacent beams which are P-polarized and S-polarized respectively, and both rotated some degrees according to said second and third predetermined angles.

6. An optical pick-up head, for picking up information on an optical disk, as claimed in claim 5, wherein said first and second predetermined angles are 45 degrees.

7. An optical pick-up head, for picking up information on an optical disk, as claimed in claim 5, wherein said third predetermined angle $\phi$ is determined by the equation:

$$\phi < 90° - \sin^{-1}(1/n),$$

wherein n is the refractive index of the material of said first and second prisms.

8. An optical pick-up head, for picking up information on an optical disk, as claimed in claim 7, wherein said first and second predetermined angles are 45 degrees.

9. An optical pick-up head, for picking up information on an optical disk, as claimed in claim 5, further comprising a half wavelength plate for guiding said reflected light beam to rotate 45 degrees.

* * * * *